United States Patent
Cao et al.

(10) Patent No.: US 10,351,465 B2
(45) Date of Patent: Jul. 16, 2019

(54) GLASS FIBER COMPOSITION, GLASS FIBER AND COMPOSITE MATERIAL THEREFROM

(71) Applicant: JUSHI GROUP CO., LTD., Tongxiang (CN)

(72) Inventors: Guorong Cao, Tongxiang (CN); Wenzhong Xing, Tongxiang (CN); Lin Zhang, Tongxiang (CN); Guijiang Gu, Tongxiang (CN)

(73) Assignee: JUSHI GROUP CO., LTD., Tongxiang, Zhejiang (CN)

( * ) Notice: Subject to any disclaimer, the term of this patent is extended or adjusted under 35 U.S.C. 154(b) by 119 days.

(21) Appl. No.: 15/511,585

(22) PCT Filed: Dec. 29, 2014

(86) PCT No.: PCT/CN2014/095400
§ 371 (c)(1),
(2) Date: Mar. 15, 2017

(87) PCT Pub. No.: WO2016/045221
PCT Pub. Date: Mar. 31, 2016

(65) Prior Publication Data
US 2018/0230039 A1    Aug. 16, 2018

(30) Foreign Application Priority Data
Sep. 22, 2014  (CN) .......................... 2014 1 0486801

(51) Int. Cl.
C03C 3/087    (2006.01)
C03C 13/00    (2006.01)
C03C 3/095    (2006.01)

(52) U.S. Cl.
CPC .............. *C03C 3/087* (2013.01); *C03C 3/095* (2013.01); *C03C 13/00* (2013.01); *C03C 2201/32* (2013.01); *C03C 2201/3423* (2013.01); *C03C 2201/42* (2013.01); *C03C 2201/50* (2013.01); *C03C 2213/00* (2013.01)

(58) Field of Classification Search
CPC ......... C03C 30/87; C03C 3/095; C03C 13/00; C03C 13/06; C03C 3/087
See application file for complete search history.

(56) References Cited

U.S. PATENT DOCUMENTS

| | | |
|---|---|---|
| 3,892,581 A | 7/1975 | Burgman et al. |
| 4,199,364 A | 4/1980 | Neely |
| 6,417,124 B1 | 7/2002 | Peuchert et al. |
| 6,809,050 B1 | 10/2004 | McGinnis |
| 2005/0096208 A1 | 5/2005 | Zachau et al. |
| 2007/0105701 A1* | 5/2007 | Hoffmann ............... C03C 13/00 501/36 |
| 2008/0009403 A1* | 1/2008 | Hofmann ............... C03C 13/00 501/55 |
| 2010/0160528 A1 | 6/2010 | Fujiwara et al. |
| 2014/0158201 A1 | 6/2014 | Aitken et al. |
| 2017/0283309 A1 | 10/2017 | Cao et al. |
| 2018/0118608 A1* | 5/2018 | Zhang ................. C03C 3/087 |

FOREIGN PATENT DOCUMENTS

| | | |
|---|---|---|
| CN | 1802327 | 7/2006 |
| CN | 101119939 | 2/2008 |
| CN | 101687692 | 3/2010 |
| CN | 101691278 | 4/2010 |
| CN | 101838110 | 9/2010 |
| CN | 102482142 | 5/2012 |
| JP | 2006-22236 | 1/2006 |
| JP | 2011-162415 | 8/2011 |
| WO | 2013/020128 A1 | 2/2013 |

OTHER PUBLICATIONS

From Chinese Patent Application No. 201410486801.3, Search Report dated Nov. 16, 2015.
From Chinese Patent Application No. 201410486801.3, Office Action dated Nov. 24, 2015 with English translation.
From Chinese Patent Application No. 201410487975.1, Search Report dated Nov. 16, 2015.
From Chinese Patent Application No. 201410487975.1, Office Action dated Nov. 24, 2015 with English translation.
From Chinese Patent Application No. 201010176217.x, Reexamination Decision dated Aug. 30, 2013 with English translation.
From Chinese Patent Application No. 201010176217.x, Rejected Decision dated Oct. 26, 2011 with English translation.
From Chinese Patent Application No. 201010176217.x, Office Action dated Apr. 28, 2011 with English translation.
From PCT/CN2014/095400, International Search Report dated Jun. 16, 2015 with English translation.
From PCT/CN2014/095400, Written Opinion dated Jun. 16, 2015 with English translation.
From PCT/CN2014/095400, International Preliminary Report on Patentability (IPRP; Ch. I) dated Mar. 28, 2017 with English translation.
From PCT/CN2014/095401, International Search Report dated Jun. 12, 2015 with English translation.
From PCT/CN2014/095401, Written Opinion dated Jun. 12, 2015 with English translation.
From PCT/CN2014/095401, International Preliminary Report on Patentability (IPRP; Ch. I) dated Mar. 28, 2017 with English translation.

(Continued)

*Primary Examiner* — Elizabeth A. Bolden
(74) *Attorney, Agent, or Firm* — Ladas & Parry, LLP

(57) ABSTRACT

The present invention provides a glass fiber composition, glass fiber and composite material therefrom. The glass fiber composition comprises the following components expressed as percentage by weight: 58-63% $SiO_2$, 13-17% $Al_2O_3$, 6-11.8% CaO, 7-11% MgO, 3.05-8% SrO, 0.1-2% $Na_2O$+$K_2O$+$Li_2O$, 0.1-1% $Fe_2O_3$, 0-1% $CeO_2$ and 0-2% $TiO_2$, wherein a weight percentage ratio C1=(MgO+SrO)/CaO is greater than 1. Said composition greatly improves the refractive index of glass, significantly shields against harmful rays for humans and further reduces glass crystallization risk and production costs, thereby making it more suitable for large-scale production with refractory-lined furnaces.

14 Claims, No Drawings

(56) References Cited

OTHER PUBLICATIONS

From PCT/CN2011/074283, International Search Report dated Aug. 25, 2011 with English translation.
From PCT/CN2011/074283, Written Opinion dated Aug. 25, 2011 with English translation.
From PCT/CN2011/074283, International Preliminary Report on Patentability (IPRP; Ch. II) dated Aug. 17, 2012 with English translation.
From U.S. Appl. No. 15/511,582 (unpublished), Application and Office Actions.
From EP 1402825.0, Extended European Search Report, dated Mar. 19, 2018.

* cited by examiner

GLASS FIBER COMPOSITION, GLASS FIBER AND COMPOSITE MATERIAL THEREFROM

CROSS REFERENCE TO RELATED APPLICATIONS

This application is the U.S. national phase of PCT Application No. PCT/CN2014/095400 filed on Dec. 29, 2014, which claims the priority of Chinese Patent Application 201410486801.3, filed Sep. 22, 2014 and titled "A Glass Fiber Composition, Glass Fiber and Composite Material Therefrom", the disclosures of which are incorporated in their entireties by reference herein.

FIELD OF THE INVENTION

The present invention relates to a composition, and a glass fiber and a composite material therefrom, specifically, to a glass fiber composition, and a glass fiber and a composite material therefrom.

BACKGROUND OF THE INVENTION

Glass fiber is an inorganic fiber material and can be used to reinforce resins to produce composite materials with good performance. As a reinforcing base material for advanced composite materials, high-performance glass fibers were originally used mainly in the national defense industry, such as aeronautic, aerospace and military industry. With the progress of science and technology and the development of economy, high-performance glass fibers have been widely used in civil and industrial fields such as motors, wind blades, pressure vessels, offshore oil pipes, sports apparatus and auto industry.

Since the US developed S-2 glass fiber, different countries have competed in developing high-performance glass fibers with various compositions, e.g. R glass fiber developed by France, HiPer-tex glass fiber developed by the US and high-strength glass fiber 2# developed by China. The original high-performance glass compositions were based on an MgO—Al2O3-SiO2 system and a typical solution was S-2 glass of the US. However, the production of S-2 glass is excessively difficult, as its forming temperature is up to about 1571° C. and its liquidus temperature up to 1470° C. and therefore it is difficult to realize large-scale industrial production.

Thereafter, in order to decrease the melting temperature and forming temperature of glass to better satisfy the needs of large-scale production with refractory-lined furnaces, large foreign companies successively developed high-performance glasses based on an MgO—CaO—$Al_2O_3$—$SiO_2$ system. Typical solutions were R glass of France and HiPer-tex glass of the US, which were a trade-off for production scale by sacrificing some of the glass properties. However, as these designed solutions were too conservative, especially the content of $Al_2O_3$ was kept more than 20%, preferably 25%, the production of glass remained highly difficult. Although small-scale production with refractory-lined furnaces was achieved, the production efficiency was low and the cost performance ratio of the products was not high. The traditional R glass is difficult to fiberized as its forming temperature is up to about 1410° C. and its liquidus temperature up to 1330° C., which causes difficulty in attenuating glass fiber and consequently in realizing large-scale industrial production.

The High-strength 2# glass fiber mainly comprises $SiO_2$, $Al_2O_3$ and MgO, and certain amounts of $Li_2O$, $B_2O_3$, $CeO_2$ and $Fe_2O_3$ are also introduced. It also has high strength and high modulus and its forming temperature is only about 1245° C. and its liquidus temperature is 1320° C. Both temperatures are much lower than those of S glass fiber. However, since its forming temperature is lower than its liquidus temperature, which is unfavorable for the control of glass fiber attenuation, the forming temperature has to be increased and specially-shaped tips have to be used to prevent a glass crystallization phenomenon from occurring in the fiber attenuation process. This causes difficulty in temperature control and also makes it difficult to realize large-scale industrial production.

In addition, there is an improved type of R glass fiber, and its strength and modulus are much higher than those of the traditional E glass fiber and its melting and forming conditions are better than those of the traditional R glass fiber. However, this type of R glass has a high risk of devitrification. Meanwhile, since too much $Li_2O$ is introduced, not only the chemical stability of the glass is decreased, but also its raw material cost gets significantly higher. Therefore it is also not suitable for large-scale industrial production.

SUMMARY OF THE INVENTION

One of the purposes of the present invention is to provide a high-performance glass fiber composition which can solve any of the aforesaid issues and can be used as a reinforcing base material for advanced composites. The said glass fiber composition not only ensures that the glass fiber made therefrom has higher mechanical properties, a lower crystallization temperature and lower crystallization risk, and also greatly improves the refractive index of glass and can significantly block the rays harmful to human bodies.

According to one aspect of the present invention, a glass fiber composition is provided comprising the following components expressed as percentage by weight:

| | |
|---|---|
| $SiO_2$ | 58-63% |
| $Al_2O_3$ | 13-17% |
| CaO | 6-11.8% |
| MgO | 7-11% |
| SrO | 3.05-8% |
| $Na_2O + K_2O + Li_2O$ | 0.1-2% |
| $Fe_2O_3$ | 0.1-1% |
| $CeO_2$ | 0-1% |
| $TiO_2$ | 0-2% | wherein, a weight percentage ratio C1=(MgO+SrO)/CaO is greater than 1.

Wherein, a weight percentage ratio C2=MgO/SrO is greater than 2.

Wherein, a weight percentage ratio C3=$K_2O$/($Na_2O$+$Li_2O$) is 0.8-1.5, and the range of the weight percentage ratio C4=$Li_2O$/$Na_2O$ is 1-4.

Wherein, a weight percentage ratio C1=(MgO+SrO)/CaO is 1.05-1.85.

Wherein, the content of $CeO_2$ by weight percentage is 0.02-0.4%, or the content of CaO by weight percentage is 8-11%.

Wherein, the composition comprises the following components expressed as percentage by weight:

| | |
|---|---|
| $SiO_2$ | 59-62% |
| $Al_2O_3$ | 14-16.5% |
| CaO | 8-11% |
| MgO | 8-10% |

-continued

| | |
|---|---|
| SrO | 3.05-5% |
| $Na_2O + K_2O + Li_2O$ | 0.1-2% |
| $Fe_2O_3$ | 0.1-1% |
| $CeO_2$ | 0-1% |
| $TiO_2$ | 0-2% | wherein, a weight percentage ratio C1=(MgO+SrO)/CaO is 1.05-1.85;

a weight percentage ratio C2=MgO/SrO is greater than 2.

Wherein, the composition comprises the following components expressed as percentage by weight:

| | |
|---|---|
| $SiO_2$ | 59-62% |
| $Al_2O_3$ | 14-16.5% |
| CaO | 8-11% |
| MgO | 8-10% |
| SrO | 3.1-4.5% |
| $Na_2O + K_2O + Li_2O$ | 0.1-2% |
| $Fe_2O_3$ | 0.1-1% |
| $CeO_2$ | 0.02-0.4% |
| $TiO_2$ | 0.1-1.5% | wherein, a weight percentage ratio C1=(MgO+SrO)/CaO is greater than 1;

a weight percentage ratio C2=MgO/SrO is greater than 2;

a weight percentage ratio C3=$K_2O$/($Na_2O+Li_2O$) is 0.8-1.5;

a weight percentage ratio C4=$Li_2O$/$Na_2O$ is 1-4.

Wherein, the composition comprises the following components expressed as percentage by weight:

| | |
|---|---|
| $SiO_2$ | 59-62% |
| $Al_2O_3$ | 14-16.5% |
| CaO | 8-11% |
| MgO | 8-10% |
| SrO | 3.1-4.5% |
| $Na_2O + K_2O + Li_2O$ | 0.1-2% |
| $Fe_2O_3$ | 0.1-1% |
| $TiO_2$ | 0.1-1.5% | wherein, a weight percentage ratio C1=(MgO+SrO)/CaO is 1.05-1.85;

a weight percentage ratio C2=MgO/SrO is 2.05-3.0;

a weight percentage ratio C3=$K_2O$/($Na_2O+Li_2O$) is 0.85-1.25;

a weight percentage ratio C4=$Li_2O$/$Na_2O$ is 1.5-3.0.

According to another aspect of this invention, a glass fiber produced with said glass fiber composition is provided.

According to yet another aspect of this invention, a composite material incorporating said glass fiber is provided.

By using the combination of components with the above proportions, the glass fiber composition of the present invention not only ensures the mechanical properties of R glass, but also greatly improves the refractive index of glass and significantly shields against harmful rays for humans, and further reduces the crystallization risk and production costs, thereby making it more suitable for large-scale production with refractory-lined furnaces.

Specifically, the glass fiber composition according to the present invention comprises the following components expressed as percentage by weight:

Wherein, the composition comprises the following components expressed as percentage by weight:

| | |
|---|---|
| $SiO_2$ | 58-63% |
| $Al_2O_3$ | 13-17% |
| CaO | 6-11.8% |
| MgO | 7-11% |
| SrO | 3.05-8% |
| $Na_2O + K_2O + Li_2O$ | 0.1-2% |
| $Fe_2O_3$ | 0.1-1% |
| $CeO_2$ | 0-1% |
| $TiO_2$ | 0-2% | wherein, a weight percentage ratio C1=(MgO+SrO)/CaO is greater than 1.

The effect and content of each component in said glass fiber composition is described as follows:

$SiO_2$ is a main oxide forming the glass network and has the effect of stabilizing all the components. In the glass fiber composition of the present invention, the restricted content range of $SiO_2$ is 58-63%. $SiO_2$ content being too low will affect the mechanical properties of the glass; $SiO_2$ content being too high will cause the glass viscosity to be excessively high thereby resulting in melting and clarifying issues. Preferably, the $SiO_2$ content range can be 59-62%.

$Al_2O_3$ is another oxide forming the glass network. When combined with $SiO_2$, it can have a substantive effect on the mechanical properties of the glass and a significant effect on preventing glass phase separation and on water resistance. The restricted content range of $Al_2O_3$ in the glass fiber composition of this invention is 13-17%. $Al_2O_3$ content being too low will increase the liquidus temperature and meanwhile decrease the mechanical properties and water resistance of glass; $Al_2O_3$ content being too high will cause the glass viscosity to be excessively high thereby resulting in melting and clarifying issues, and increase the devitrification risk of glass. Preferably, the $Al_2O_3$ content can be 14-16.5%.

The glass fiber composition of this invention uses the CaO, MgO and SrO ternary mixed alkali earth effect. Generally, the CaO and MgO binary mixed alkali earth effect is well known to the person skilled in the art, while the CaO, MgO and SrO ternary mixed alkali earth effect, especially when the content of CaO+MgO+SrO exceeds 15% and the content of SrO exceeds 3%, has scarcely been reported. The following is a detailed description of the CaO, MgO and SrO ternary mixed alkali earth effect in this invention and how the contents of these three components are determined respectively.

Firstly, for comparison, the CaO and MgO binary mixed alkali earth effect is briefly described. CaO primarily has the effect of regulating the glass viscosity and controlling the glass crystallization. MgO has the similar effect and plays a significant role in increasing the modulus of glass. By rationally determining the content ratio of CaO to MgO and taking advantage of competitive growth between the two crystals, i.e. anorthite ($CaAl_2Si_2O_8$) and diopside ($CaMgSi_2O_6$), the growth of the two crystals is delayed, thereby achieving the objective of reducing the risk of devitrification.

We find from a great amount of experiments and researches that, when their ratios are rational, the technical effect of the CaO, MgO and SrO ternary mixed alkali earth effect is better than that of the CaO and MgO binary mixed alkali earth effect. This is because, as more alkali earth metal ions with different radius participate in the replacement process, a compact stacking structure forms more easily and thereby the glass has better mechanical, optical and corrosion resistance properties. As for CaO, MgO and SrO introduced into the glass fiber composition of the invention, in order to achieve a compact stacking structure, the matching between the numbers of three types of ions, i.e. $Ca^{2+}$, $Mg^{2+}$ and $Sr^{2+}$, in this invention becomes very important. Since the ionic radiuses of $Mg^{2+}$, $Ca^{2+}$ and $Sr^{2+}$ sequentially become bigger, the ions with the smallest radius and those with the biggest radius need to be matched well. The research shows that, when an appropriate amount of SrO is introduced in the glass fiber composition and the ratio of (MgO+SrO)/CaO is rationally adjusted, the tendency and rate of the glass crystallization can be effectively controlled, and a certain amount of SrO is introduced only when the content of MgO is relatively high. A ratio of MgO/SrO within a reasonable range greatly enhances the mixed alkali earth effect. Therefore, by taking CaO, MgO and SrO as the parameters for controlling the mechanical, optical and crystallization properties of glass fiber, this application determines the contents of these three components in the corresponding glass systems so as to achieve better mechanical and optical properties and a lower crystallization temperature and risk.

In addition, compared with the traditional glasses which use the binary alkali earth effect, the glass composition in this application has a relative lower content of CaO, which can not only help produce a moderate rate of hardening of molten glass and improve the fiber forming efficiency of high-performance glasses, but also make a more compact ternary structure by using a higher content of MgO to match SrO. However, the content of CaO cannot be too low, otherwise the competitive growth between anorthite and diopside crystals will lose the balance, thereby increasing the risk of devitrification.

Further, on the premise of a relatively high total content of alkali earth metal oxides in this invention, the content of MgO is properly increased so as to introduce SrO more effectively, which can significantly strengthen the synergistic effect of these two components. The research shows that, in a glass system with a high content of alkali earth metal oxides, and when the content of SrO is kept above 3%, especially between 3.05-8%, the synergistic effect of SrO and MgO will not only effectively improve the refractive index of glass, but also significantly shield against harmful rays, e.g. X-rays, γ-rays and β-rays, for humans. Preferably, the content range of SrO can be 3.05-5%, and more preferably 3.1-4.5%.

Therefore, the present invention comprehensively considers the CaO, MgO and SrO ternary mixed alkali earth effect and selects an appropriate SrO content to be able to achieve higher mechanical properties and a lower crystallization temperature and risk, effectively improve glass refractive index and significantly shield against harmful rays for humans. In the glass fiber composition of this invention, the restricted content range of CaO is 6-11.8%, MgO is 7-11% and SrO is 3.05-8%, and a weight percentage ratio C1=(MgO+SrO)/CaO is above 1. Preferably, the restricted content range of CaO can be 8-11%, MgO is 8-10% and SrO is 3.05-5%, and more preferably the restricted content range of SrO can be 3.1-4.5%. Preferably, the weight percentage ratio C1=(MgO+SrO)/CaO can be 1.05-1.85.

Our research shows, from the perspective of simple replacement, compared with CaO, SrO can better improve the compressive strength and refractive index of the glass and the difference in their effect on the rate of hardening of molten glass (workability) is big; compared with MgO, SrO can better improve the tensile strength, elastic modulus and refractive index of the glass and the difference in their effect on the rate of hardening of molten glass is small. At the same time, considering the matching between the sizes of ions, it is appropriate to control the ratio of the sum of SrO and MgO to CaO. The inventors have found that, when C1 is set to be above 1, especially between 1.05-1.85, the mechanical properties and refractive index of the glass have improved especially significantly on one hand and, on the other hand, the crystallization temperature and degree of the glass have decreased especially noticeably. The inventors believe that this is perhaps because the stacking of the ternary alkali earth oxides is so compact with the aforementioned range that the glass structure becomes especially stable, thereby resulting in an unexpected improvement of the glass properties.

The specific beneficial effects achieved by making full use of the synergy of CaO, MgO and SrO and by selecting the appropriate content ranges for each of them and the ratios therebetween will be explained through the determined values of relevant parameters given in the tables of the detailed examples hereafter.

The glass will have an improved refractive index and a better shielding effect against the rays harmful to humans when the contents for CaO, MgO and SrO are respectively determined, the ratio C1 is controlled, and in the meantime, the ratio of MgO to SrO is set within a certain range. In this invention, for example, a weight percentage ratio C2=MgO/SrO can be greater than 2, preferably between 2.05-3.0.

Both $K_2O$ and $Na_2O$ can reduce glass viscosity and are good fluxing agents. Replacing $Na_2O$ with $K_2O$ while keeping the total amount of alkali metal oxides unchanged can reduce the crystallization tendency of glass, improve the fiberizing performance, and also reduce the surface tension of molten glass and improve the glass melting performance. A small amount of $Li_2O$ is also introduced in this invention. Compared with $Na_2O$ and $K_2O$, $Li_2O$ can not only significantly reduce glass viscosity thereby improving the glass melting performance, but also help remarkably improve the mechanical properties of glass. However, the introduced amount of alkali metals should be limited so as to avoid reducing the chemical stability of glass. Therefore, in the glass fiber composition of the present invention, the restricted content range of $Na_2O+K_2O+Li_2O$ is 0.1-2%, wherein the weight percentage ratio $C3=K_2O/(Na_2O+Li_2O)$ can be 0.8-1.5, and the weight percentage ratio $C4=Li_2O/Na_2O$ is 1-4. Preferably, the weight percentage ratio $C3=K_2O/(Na_2O+Li_2O)$ can be 0.85-1.25, and the weight percentage ratio $C4=Li_2O/Na_2O$ is 1.5-3.0.

The introduction of $Fe_2O_3$ facilitates the melting of glass and can also improve the crystallization performance of glass. However, since ferric ions and ferrous ions have a coloring effect, the introduced amount should be limited. Therefore, in the glass fiber composition of the present invention, the restricted content range of $Fe_2O_3$ is 0.1-1%.

$CeO_2$ can not only produce an excellent nontoxic clarifying effect, but also oxidize a portion of the ferrous ions into ferric ions, and lighten the green color of the glass fiber. As high-strength glasses in the prior art are difficult to clarify and homogenize, in order to ensure the clarifying and homogenizing quality of the glass melt, a proper amount of $CeO_2$ is introduced in the glass fiber composition of this invention. The restricted content range of $CeO_2$ in this invention is 0~1%. Preferably, the $CeO_2$ content can be 0.02~0.4%.

$TiO_2$ can not only reduce the glass viscosity at high temperature, but also has a certain fluxing effect. Therefore, in the glass fiber composition of the present invention, the restricted content range of $TiO_2$ is 0-2%. Preferably, the content range of $TiO_2$ is 0.1-1.5%.

In addition, the glass fiber composition of the present invention allows the existence of a small amount of fluorine. However, considering the great negative impact of fluorine on environment, normally it is not intentionally added.

In the glass fiber composition of the present invention, the beneficial effects produced by the aforementioned selected ranges of the components will be explained through the specific experimental data provided below.

The following are examples of preferred content ranges of the components contained in the glass fiber composition according to the present invention.

Preferred Example 1

The glass fiber composition according to the present invention comprises the following components expressed as percentage by weight:

| | |
|---|---|
| $SiO_2$ | 59-62% |
| $Al_2O_3$ | 14-16.5% |
| CaO | 8-11% |
| MgO | 8-10% |
| SrO | 3.05-5% |
| $Na_2O + K_2O + Li_2O$ | 0.1-2% |
| $Fe_2O_3$ | 0.1-1% |
| $CeO_2$ | 0-1% |
| $TiO_2$ | 0-2% | wherein, a weight percentage ratio C1=(MgO+SrO)/CaO is 1.05-1.85; and
a weight percentage ratio C2=MgO/SrO is greater than 2.

Preferred Example 2

The glass fiber composition according to the present invention comprises the following components expressed as percentage by weight:

| | |
|---|---|
| $SiO_2$ | 59-62% |
| $Al_2O_3$ | 14-16.5% |
| CaO | 8-11% |
| MgO | 8-10% |
| SrO | 3.1-4.5% |
| $Na_2O + K_2O + Li_2O$ | 0.1-2% |
| $Fe_2O_3$ | 0.1-1% |
| $CeO_2$ | 0.02-0.4% |
| $TiO_2$ | 0.1-1.5% | wherein, a weight percentage ratio C1=(MgO+SrO)/CaO is greater than 1;
a weight percentage ratio C2=MgO/SrO is greater than 2;
a weight percentage ratio C3=$K_2O$/($Na_2O+Li_2O$) is 0.8-1.5; and
a weight percentage ratio C4=$Li_2O/Na_2O$ is 1-4.

Preferred Example 3

The glass fiber composition according to the present invention comprises the following components expressed as percentage by weight:

| | |
|---|---|
| $SiO_2$ | 59-62% |
| $Al_2O_3$ | 14-16.5% |
| CaO | 8-11% |
| MgO | 8-10% |
| SrO | 3.1-4.5% |
| $Na2O + K2O + Li_2O$ | 0.1-2% |
| $Fe2O3$ | 0.1-1% |
| $TiO2$ | 0.1-1.5% | wherein, a weight percentage ratio C1=(MgO+SrO)/CaO is 1.05-1.85;
a weight percentage ratio C2=MgO/SrO is 2.05-3.0;
a weight percentage ratio C3=$K_2O$/($Na_2O+Li_2O$) is 0.85-1.25; and
a weight percentage ratio C4=$Li_2O/Na_2O$ is 1.5-3.0.

DETAILED DESCRIPTION OF THE INVENTION

In order to better clarify the purposes, technical solutions and advantages of the examples of the present invention, the technical solutions in the examples of the present invention are clearly and completely described below by way of the drawings in the examples. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is, by making full use of the synergistic effect of CaO, MgO and SrO, selecting an appropriate content range for each of them and the ratios therebetween, and adjusting the proportions for trace amounts of other components introduced, a glass fiber is formed with an improved refractive index and an excellent effect in shielding against harmful rays for humans.

In accordance with the specific embodiments mentioned above, the specific content values of $SiO_2$, $Al_2O_3$, CaO, MgO, SrO, $Na_2O$, $K_2O$, $Fe_2O_3$, $Li_2O$, $CeO_2$ and $TiO_2$ in the glass fiber composition of the present invention are selected to be used in the examples, which are compared with the properties of traditional E and R glasses in terms of the following five property parameters, (1) Forming temperature, the temperature at which the glass melt has a viscosity of $10^3$ poise.

(2) Liquidus temperature, the temperature at which the crystal nucleuses begin to form when the glass melt cools off, i.e., the upper limit temperature for glass crystallization.

(3) ΔT value, which is the difference between the forming temperature and the liquidus temperature and indicates the temperature range at which fiber drawing can be performed.

(4) Filament strength, the tensile strength that a filament of glass fiber strand can withstand.

5) Refractive index, the ratio of the speed of light in air and the speed of light in glass.

The aforementioned five parameters and the methods of measuring them are well-known to one skilled in the art. Therefore, the aforementioned parameters can be effectively used to explain the properties of the glass fiber composition of the present invention.

The specific procedures for the experiments are as follows: Each component can be acquired from the appropriate raw materials; the raw materials are mixed in the appropriate proportions so that each component reaches the final expected weight percentage; the mixed batch is melted and clarified; then the molten glass is drawn out through the tips of the bushings, thereby forming the glass fiber; the glass fiber is attenuated onto the rotary collet of a winder to form cakes or packages. Of course, conventional methods can be used to deeply process these glass fibers to meet the expected requirements.

The exemplary embodiments of the glass fiber composition according to the present invention are given below.

Example 1

A glass fiber composition comprises the following components expressed as percentage by weight,

| | |
|---|---|
| $SiO_2$ | 59.5% |
| $Al_2O_3$ | 15.2% |
| CaO | 11.2% |
| MgO | 8.0% |
| SrO | 3.85% |
| $Na_2O$ | 0.2% |
| $K_2O$ | 0.6% |
| $Li_2O$ | 0.4% |
| $Fe_2O_3$ | 0.4% |
| $CeO_2$ | 0% |
| $TiO_2$ | 0.65% | wherein, the weight percentage ratio $C1=(MgO+SrO)/CaO$ is 1.06, and the weight percentage ratio $C2=MgO/SrO$ is 2.08, and the weight percentage ratio $C3=K_2O/(Na_2O+Li_2O)$ is 1.0.

In Example 1, the measured values of the five parameters are respectively:

| | |
|---|---|
| Forming temperature | 1280° C. |
| Liquidus temperature | 1196° C. |
| ΔT | 84° C. |
| Filament strength | 4153 MPa |
| Refractive index | 1.571 |

Example 2

A glass fiber composition comprises the following components expressed as percentage by weight,

| | |
|---|---|
| $SiO_2$ | 59.7% |
| $Al_2O_3$ | 15.4% |
| CaO | 8.3% |
| MgO | 10% |
| SrO | 4.5% |
| $Na_2O$ | 0.2% |
| $K_2O$ | 0.5% |
| $Li_2O$ | 0.4% |
| $Fe_2O_3$ | 0.3% |
| $CeO_2$ | 0% |
| $TiO_2$ | 0.7% | wherein, the weight percentage ratio $C1=(MgO+SrO)/CaO$ is 1.65, and the weight percentage ratio $C2=MgO/SrO$ is 2.50, and the weight percentage ratio $C3=K_2O/(Na_2O+Li_2O)$ is 0.84.

In Example 2, the measured values of the five parameters are respectively:

| | |
|---|---|
| Forming temperature | 1282° C. |
| Liquidus temperature | 1195° C. |
| ΔT | 87° C. |
| Filament strength | 4164 MPa |
| Refractive index | 1.570 |

Example 3

A glass fiber composition comprises the following components expressed as percentage by weight,

| | |
|---|---|
| $SiO_2$ | 59.0% |
| $Al_2O_3$ | 15.3% |
| CaO | 10.5% |
| MgO | 9.3% |
| SrO | 3.1% |
| $Na_2O$ | 0.2% |
| $K_2O$ | 0.55% |
| $Li_2O$ | 0.45% |
| $Fe_2O_3$ | 0.4% |
| $CeO_2$ | 0% |
| $TiO_2$ | 0.5% | wherein, the weight percentage ratio $C1=(MgO+SrO)/CaO$ is 1.18, and the weight percentage ratio $C2=MgO/SrO$ is 3.0, and the weight percentage ratio $C3=K_2O/(Na_2O+Li_2O)$ is 0.85.

In Example 3, the measured values of the five parameters are respectively:

| | |
|---|---|
| Forming temperature | 1280° C. |
| Liquidus temperature | 1196° C. |
| ΔT | 84° C. |
| Filament strength | 4140 MPa |
| Refractive index | 1.569 |

Comparisons of the property parameters of the aforementioned examples and other examples of the glass fiber composition of the present invention with those of the traditional E glass, traditional R glass and improved R glass are further made below by way of tables, wherein the component contents of the glass fiber composition are expressed as weight percentage. What needs to be made clear is that the total amount of the components in the examples is slightly less than 100%, and it should be understood that the remaining amount is trace impurities or a small amount of components which cannot be analyzed.

TABLE 1

| | | A1 | A2 | A3 | A4 | A5 | A6 | A7 |
|---|---|---|---|---|---|---|---|---|
| Component | $SiO_2$ | 60.0 | 59.5 | 59.7 | 59.4 | 59.0 | 59.3 | 60.3 |
| | $Al_2O_3$ | 15.5 | 15.2 | 15.4 | 15.4 | 15.3 | 16.0 | 14.5 |
| | CaO | 10.8 | 11.2 | 8.3 | 8.25 | 10.5 | 10.2 | 11.0 |
| | MgO | 8.3 | 8.0 | 10 | 10.25 | 9.3 | 8.4 | 8.6 |
| | SrO | 3.05 | 3.85 | 4.5 | 5.0 | 3.1 | 3.3 | 3.5 |
| | $Na_2O$ | 0.2 | 0.2 | 0.2 | 0.15 | 0.2 | 0.2 | 0.2 |
| | $K_2O$ | 0.65 | 0.6 | 0.5 | 0.55 | 0.55 | 0.5 | 0.6 |
| | $Li_2O$ | 0.5 | 0.4 | 0.4 | 0.5 | 0.45 | 0.2 | 0.5 |

TABLE 1-continued

|  |  | A1 | A2 | A3 | A4 | A5 | A6 | A7 |
|---|---|---|---|---|---|---|---|---|
|  | $Fe_2O_3$ | 0.4 | 0.4 | 0.3 | 0.3 | 0.4 | 0.4 | 0.3 |
|  | $TiO_2$ | 0.6 | 0.65 | 0.7 | 0.2 | 0.5 | 1.5 | 0.5 |
|  | $CeO_2$ | 0 | 0 | 0 | 0 | 0 | 0 | 0 |
| Ratio | C1 | 1.05 | 1.06 | 1.65 | 1.85 | 1.18 | 1.15 | 1.10 |
|  | C2 | 2.72 | 2.08 | 2.50 | 2.05 | 3.0 | 2.55 | 2.46 |
|  | C3 | 0.93 | 1.0 | 0.84 | 0.85 | 0.85 | 1.25 | 0.86 |
|  | C4 |  |  |  |  |  |  |  |
| Parameter | Forming temperature/° C. | 1279 | 1280 | 1282 | 1284 | 1280 | 1278 | 1282 |
|  | Liquidus temperature/° C. | 1198 | 1196 | 1195 | 1193 | 1196 | 1193 | 1195 |
|  | ΔT/° C. | 81 | 84 | 87 | 91 | 84 | 85 | 87 |
|  | Filament strength/MPa | 4136 | 4153 | 4164 | 4172 | 4140 | 4100 | 4152 |
|  | Refractive index | 1.568 | 1.571 | 1.570 | 1.572 | 1.569 | 1.569 | 1.570 |

TABLE 2

|  |  | A8 | A9 | A10 | A11 | Traditional E glass | Traditional R glass | Improved R glass |
|---|---|---|---|---|---|---|---|---|
| Component | $SiO_2$ | 59.2 | 59.3 | 58.7 | 59.5 | 54.16 | 60 | 58 |
|  | $Al_2O_3$ | 15.2 | 15.0 | 15.0 | 15.5 | 14.32 | 25 | 17.9 |
|  | CaO | 9.0 | 8.7 | 9.0 | 11.1 | 22.12 | 9 | 14.4 |
|  | MgO | 8.6 | 8.0 | 7.0 | 8.7 | 0.41 | 6 | 8.5 |
|  | SrO | 6.0 | 7.0 | 8.0 | 3.1 | 0 | 0 | 0 |
|  | $B_2O_3$ | 0 | 0 | 0 | 0 | 7.6 | 0 | 0 |
|  | $Na_2O$ | 0.2 | 0.2 | 0.2 | 0.2 | 0.45 | trace amount | 0.1 |
|  | $K_2O$ | 0.6 | 0.6 | 0.6 | 0.65 | 0.25 | trace amount | 0.6 |
|  | $Li_2O$ | 0.5 | 0.5 | 0.5 | 0.45 | 0 | 0 | 0 |
|  | $Fe_2O_3$ | 0.38 | 0.3 | 0.4 | 0.4 | 0.35 | trace amount | trace amount |
|  | $TiO_2$ | 0.3 | 0.3 | 0.6 | 0.4 | 0.34 | trace amount | 0.2 |
|  | $CeO_2$ | 0.02 | 0 | 0 | 0 | 0 | 0 | 0 |
| Ratio | C1 | 1.62 | 1.72 | 1.66 | 1.06 | 0.02 | 0.67 | 0.59 |
|  | C2 | 1.43 | 1.14 | 0.88 | 2.81 | — | — | — |
|  | C3 | 0.86 | 0.86 | 0.86 | 1.0 | 0.55 | — | 6.0 |
|  | C4 |  |  |  |  |  |  |  |
| Parameter | Forming temperature/° C. | 1285 | 1287 | 1288 | 1282 | 1175 | 1430 | 1289 |
|  | Liquidus temperature/° C. | 1205 | 1206 | 1208 | 1196 | 1075 | 1350 | 1280 |
|  | ΔT/° C. | 80 | 81 | 80 | 86 | 100 | 80 | 9 |
|  | Filament strength/MPa | 4110 | 4105 | 4102 | 4146 | 3265 | 4220 | 4089 |
|  | Refractive index | 1.571 | 1.572 | 1.573 | 1.569 | 1.566 | 1.561 | 1.562 |

It can be seen from the values in the above tables that, compared with the traditional R glass, the glass fiber composition of the present invention has much lower forming temperature and liquidus temperature, which helps to reduce energy consumption and increase the fiber drawing efficiency; furthermore, the present invention offers an improved glass refractive index; in the meantime, the filament strength of the present invention is similar to that of R glass fiber. The improved R glass has a significantly reduced forming temperature, but its crystallization temperature still remains high thereby resulting in a high crystallization risk, and the temperature range fit for fiber forming is very small and thus the efficiency for mass production is very low. Meanwhile, the refractive index of improved R glass is similar to that of traditional R glass. Compared with the improved R glass, the glass fiber composition of the present invention has a much lower liquidus temperature, a much wider temperature range fit for fiber forming and a fairly increased glass refractive index, and also its filament strength is slightly higher. Compared with the traditional E glass, the glass fiber composition of the present invention has much higher filament strength. Specifically, compared with R glass, the glass fiber composition of the present invention has made a breakthrough in terms of the melting performance of glass with significantly reduced amount of bubbles under the same conditions. Furthermore, the overall technical solution of the present invention has a higher cost performance ratio compared with that of traditional R glass or improved R glass, thereby enabling the easy achievement of large-scale industrial production.

By rationally determining the content ratios among CaO, MgO and SrO, and setting the content of SrO above 3%, the present invention ensures that the resulting glass fiber has higher mechanical properties and lower crystallization temperature and risk, effectively increases the refractive index of glass, and significantly shields against harmful rays for humans; meanwhile, it greatly improves the melting and fiber forming efficiencies of glass by enabling a melting temperature and a fiberizing temperature significantly lower than those of R glass, and further reduces the amount of bubbles, viscosity and crystallization risk of glass. Therefore, the glass fiber composition of the present invention is more suitable for large-scale production with refractory-lined furnaces.

The glass fiber composition according to the present invention can be used for making glass fibers having the aforementioned excellent properties.

The glass fiber composition according to the present invention can be used in combination with one or more organic and/or inorganic materials for preparing composite materials having excellent performances, such as glass fiber reinforced base materials.

Finally, what is should be made clear is that, in this text, the terms "contain", "comprise" or any other variants are intended to mean "nonexclusively include" so that any process, method, article or equipment that contains a series of factors shall include not only such factors, but also include other factors that are not explicitly listed, or also include intrinsic factors of such process, method, object or equipment. Without more limitations, factors defined by the phrase "contain a . . . " do not rule out that there are other same factors in the process, method, article or equipment which include said factors.

The above examples are provided only for the purpose of illustrating instead of limiting the technical solutions of the present invention. Although the present invention is described in details by way of aforementioned examples, one skilled in the art shall understand that modifications can also be made to the technical solutions embodied by all the aforementioned examples or equivalent replacement can be made to some of the technical features. However, such modifications or replacements will not cause the resulting technical solutions to substantially deviate from the spirits and ranges of the technical solutions respectively embodied by all the examples of the present invention.

INDUSTRIAL APPLICABILITY OF THE INVENTION

The glass fiber composition of the present invention ensures that the resulted glass fiber has higher mechanical properties and lower crystallization temperature and risk, greatly improves the refractive index of glass, and significantly shields against harmful rays for humans; meanwhile, it greatly improves the melting effect and fiber forming efficiencies of glass and enable its melting temperature and fiberizing temperature are significantly lower than those of R glass, and further reduces the amount of bubbles, viscosity and crystallization risk of glass. Therefore, the glass fiber composition of the present invention is more suitable for large-scale production with refractory-lined furnaces. The glass fiber composition according to the present invention can be used for making glass fibers having the aforementioned excellent properties, and the glass fiber composition according to the present invention can be used in combination with one or more organic and/or inorganic materials for preparing composite materials having excellent performances, such as glass fiber reinforced base materials.

The invention claimed is:

1. A glass fiber composition, comprising the following components expressed as percentage by weight:

| | |
|---|---|
| $SiO_2$ | 58-63% |
| $Al_2O_3$ | 13-17% |
| CaO | 6-11.8% |
| MgO | 7-11% |
| SrO | 3.05-5% |
| $Na_2O + K_2O + Li_2O$ | 0.1-2% |
| $Fe_2O_3$ | 0.1-1% |
| $CeO_2$ | 0-1% |
| $TiO_2$ | 0-2% | wherein, a weight percentage ratio $C1=(MgO+SrO)/CaO$ is greater than 1;
a weight percentage ratio $C2=MgO/SrO$ is greater than 2.

2. The glass fiber composition according to claim 1, wherein the content range of CaO, by weight, is 8-11%.

3. The glass fiber composition according to claim 1, wherein the content range of $CeO_2$, by weight, is 0.02-0.4%.

4. The glass fiber composition according to claim 1, wherein the weight percentage ratio $C1=(MgO+SrO)/CaO$ is 1.05-1.85.

5. The glass fiber composition according to claim 1, wherein a weight percentage ratio $C3=K_2O/(Na_2O+Li_2O)$ is 0.8-1.5, and a weight percentage ratio $C4=Li_2O/Na_2O$ is 1-4.

6. The glass fiber composition according to claim 1, comprising the following components expressed as percentage by weight:

| | |
|---|---|
| $SiO_2$ | 59-62% |
| $Al_2O_3$ | 14-16.5% |
| CaO | 8-11% |
| MgO | 8-10% |
| SrO | 3.05-5% |
| $Na_2O + K_2O + Li_2O$ | 0.1-2% |
| $Fe_2O3$ | 0.1-1% |
| $CeO_2$ | 0-1% |
| $TiO_2$ | 0-2% | wherein, the weight percentage ratio $C1=(MgO+SrO)/CaO$ is 1.05-1.85, and
a weight percentage ratio $C2=MgO/SrO$ is greater than 2.

7. The glass fiber composition according to claim 1, comprising the following components expressed as percentage by weight:

| | |
|---|---|
| $SiO_2$ | 59-62% |
| $Al_2O_3$ | 14-16.5% |
| CaO | 8-11% |
| MgO | 8-10% |
| SrO | 3.1-4.5% |
| $Na_2O + K_2O + Li_2O$ | 0.1-2% |
| $Fe_2O_3$ | 0.1-1% |
| $CeO_2$ | 0.02-0.4% |
| $TiO_2$ | 0.1-1.5% | wherein, the weight percentage ratio $C1=(MgO+SrO)/CaO$ is greater than 1;
a weight percentage ratio $C2=MgO/SrO$ is greater than 2;
a weight percentage ratio $C3=K_2O/(Na_2O+Li_2O)$ is 0.8-1.5; and
a weight percentage ratio $C4=Li_2O/Na_2O$ is 1-4.

8. The glass fiber composition according to claim 1, comprising the following components expressed as percentage by weight:

| | |
|---|---|
| $SiO_2$ | 59-62% |
| $Al_2O_3$ | 14-16.5% |
| CaO | 8-11% |
| MgO | 8-10% |
| SrO | 3.1-4.5% |
| $Na_2O + K_2O + Li_2O$ | 0.1-2% |
| $Fe_2O_3$ | 0.1-1% |
| $TiO_2$ | 0.1-1.5% | wherein, the weight percentage ratio C1=(MgO+SrO)/CaO is 1.05-1.85;
a weight percentage ratio C2=MgO/SrO is 2.05-3.0;
a weight percentage ratio C3=$K_2O$/($Na_2O+Li_2O$) is 0.85-1.25; and
a weight percentage ratio C4=$Li_2O$/$Na_2O$ is 1.5-3.0.

9. A glass fiber being produced from the glass fiber composition described in claim 1.

10. The glass fiber according to claim 9, wherein a weight percentage ratio C2=MgO/SrO is greater than 2, and the weight percentage ratio C1=(MgO+SrO)/CaO is 1.05-1.85.

11. The glass fiber according to claim 9, wherein a weight percentage ratio C2=MgO/SrO is greater than 2, and a weight percentage ratio C3=$K_2O$/($Na_2O+Li_2O$) is 0.8-1.5, and a weight percentage ratio C4=$Li_2O$/$Na_2O$ is 1-4.

12. The glass fiber according to claim 9, comprising the following components expressed as percentage by weight:

| | |
|---|---|
| $SiO_2$ | 59-62% |
| $Al_2O_3$ | 14-16.5% |
| CaO | 8-11% |
| MgO | 8-10% |
| SrO | 3.05-5% |
| $Na_2O + K_2O + Li_2O$ | 0.1-2% |
| $Fe_2O_3$ | 0.1-1% |
| $CeO_2$ | 0-1% |
| $TiO_2$ | 0-2% | wherein, the weight percentage ratio C1=(MgO+SrO)/CaO is 1.05-1.85, and
a weight percentage ratio C2=MgO/SrO is greater than 2.

13. The glass fiber according to claim 9, comprising the following components expressed as percentage by weight:

| | |
|---|---|
| $SiO_2$ | 59-62% |
| $Al_2O_3$ | 14-16.5% |
| CaO | 8-11% |
| MgO | 8-10% |
| SrO | 3.1-4.5% |
| $Na_2O + K_2O + Li_2O$ | 0.1-2% |
| $Fe_2O_3$ | 0.1-1% |
| $CeO_2$ | 0.02-0.4% |
| $TiO_2$ | 0.1-1.5% | wherein, the weight percentage ratio C1=(MgO+SrO)/CaO is greater than 1;
a weight percentage ratio C2=MgO/SrO is greater than 2;
a weight percentage ratio C3=$K_2O$/($Na_2O+Li_2O$) is 0.8-1.5; and
a weight percentage ratio C4=$Li_2O$/$Na_2O$ is 1-4.

14. A composite material incorporating the glass fiber described in claim 9.

* * * * *